(12) United States Patent
Zhong et al.

(10) Patent No.: US 8,760,189 B2
(45) Date of Patent: Jun. 24, 2014

(54) APPARATUS TO IMPLEMENT SYMMETRIC SINGLE-ENDED TERMINATION IN DIFFERENTIAL VOLTAGE-MODE DRIVERS

(75) Inventors: Cheng Zhong, San Diego, CA (US); Vannam Dang, San Diego, CA (US); Miao Li, San Diego, CA (US); Fares K. Maarouf, San Diego, CA (US); Tirdad Sowlati, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/248,485

(22) Filed: Sep. 29, 2011

(65) Prior Publication Data
US 2013/0082744 A1 Apr. 4, 2013

(51) Int. Cl.
*H03K 17/16* (2006.01)

(52) U.S. Cl.
USPC .......................................................... 326/30

(58) Field of Classification Search
USPC .......................................... 326/30; 327/108
See application file for complete search history.

(56) References Cited

U.S. PATENT DOCUMENTS

| | | | |
|---|---|---|---|
| 6,753,699 B2 | 6/2004 | Stockstad | |
| 7,078,943 B2 * | 7/2006 | Ho et al. | 327/108 |
| 7,129,756 B2 * | 10/2006 | Omote | 326/115 |
| 7,129,765 B2 | 10/2006 | Vadi et al. | |
| 7,330,075 B2 | 2/2008 | Chiang | |
| 7,635,990 B1 | 12/2009 | Ren et al. | |
| 7,728,630 B1 * | 6/2010 | Ren et al. | 326/86 |
| 8,390,314 B2 * | 3/2013 | Dang et al. | 326/21 |
| 2002/0190754 A1 | 12/2002 | Brunolli | |
| 2009/0153219 A1 | 6/2009 | Wu et al. | |
| 2010/0231266 A1 | 9/2010 | Kishor | |

OTHER PUBLICATIONS

International Search Report and Written Opinion—PCT/US2012/058172—ISA/EPO—Feb. 2, 2013.

* cited by examiner

*Primary Examiner* — Thienvu Tran
(74) *Attorney, Agent, or Firm* — Sam Talpalatsky; Nicholas J. Pauley; Joseph Agusta

(57) ABSTRACT

A differential voltage mode driver for implementing symmetric single ended termination includes an output driver circuitry having a predefined termination impedance. The differential voltage mode driver also includes an output driver replica having independently controlled first and second portions. The first and second portions are independently controlled to establish a substantially equal on-resistance of the first and the second portions. The output driver replica controls the predefined termination impedance of the output driver circuitry.

19 Claims, 4 Drawing Sheets

APPARATUS TO IMPLEMENT SYMMETRIC SINGLE-ENDED TERMINATION IN DIFFERENTIAL VOLTAGE-MODE DRIVERS

TECHNICAL FIELD

The present disclosure relates generally to voltage-mode drivers. More specifically, the disclosure relates to an apparatus for implementing symmetric single ended termination in a differential voltage-mode driver.

BACKGROUND

Reducing power consumption of circuits to increase battery life is one of the main design concerns especially in portable applications. In many serializer/deserializer (SerDes) designs like those complying with backplane standards, such as M-PHY, a low-swing differential output driver scheme can achieve low power consumption and good signal integrity. In this scheme, there are two types of output drivers, a current-mode driver and a voltage-mode driver. Compared with current-mode drivers, voltage-mode drivers are more power efficient by using less current to get the same output voltage swing. Voltage-mode drivers may have differential outputs and/or single ended outputs.

In voltage-mode driver design, one of the design challenges is how to set the active output resistance or impedance to match with the proper termination impedance in both differential and single-ended output to meet design specifications. For example, proper termination impedance can enable the voltage-mode driver to meet the specifications on return loss, output common mode voltage, and single-ended/differential output resistance. Previous solutions set differential output resistance to proper termination impedance. However, previous solutions fail to balance the single-ended output resistance and cannot be set to achieve proper termination impedance. This failure can cause common-mode voltage shift, different reflection on different output lines and even cause the single-ended output resistance to drift outside the specification. Accordingly, a need exists for an improved integrated circuit and an improved method of controlling output impedance.

SUMMARY

According to some aspects of the disclosure, an apparatus includes output driver circuitry having a predefined termination impedance. The apparatus also includes an output driver replica having independently controlled first and second portions. The first and second portions are independently controlled to establish a substantially equal on-resistance of the first and the second portions. The output driver replica controls the predefined termination impedance of the output driver circuitry.

According to some aspects of the disclosure, a method includes controlling a first portion of an output driver replica of a voltage mode driver. The method also includes independently controlling a second portion of the output driver replica to establish a substantially equal on-resistance of the first and the second portions. The independent control creates a balanced single-ended output resistance of the voltage mode driver.

According to some aspects of the disclosure, an apparatus includes means for driving an output of a voltage mode driver having a predefined termination impedance. The apparatus also includes means for replicating the output driver means by independently controlling a first and a second portion of the replica means to establish a substantially equal on-resistance of the first and the second portions. The replica means controls the predefined termination impedance of the output driving means.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Some aspects of the disclosure implement a symmetric single-ended output resistance or impedance with a proper termination impedance and thus benefit both differential and single-ended termination.

Many different types of driver circuits with on-chip termination have been developed to improve signal integrity in high-speed data communications. For example, on-chip termination provides improved signal integrity between a transceiver over a transmission medium by matching the output impedance of the transceiver with the input impedance of the transmission medium.

Figure 1:
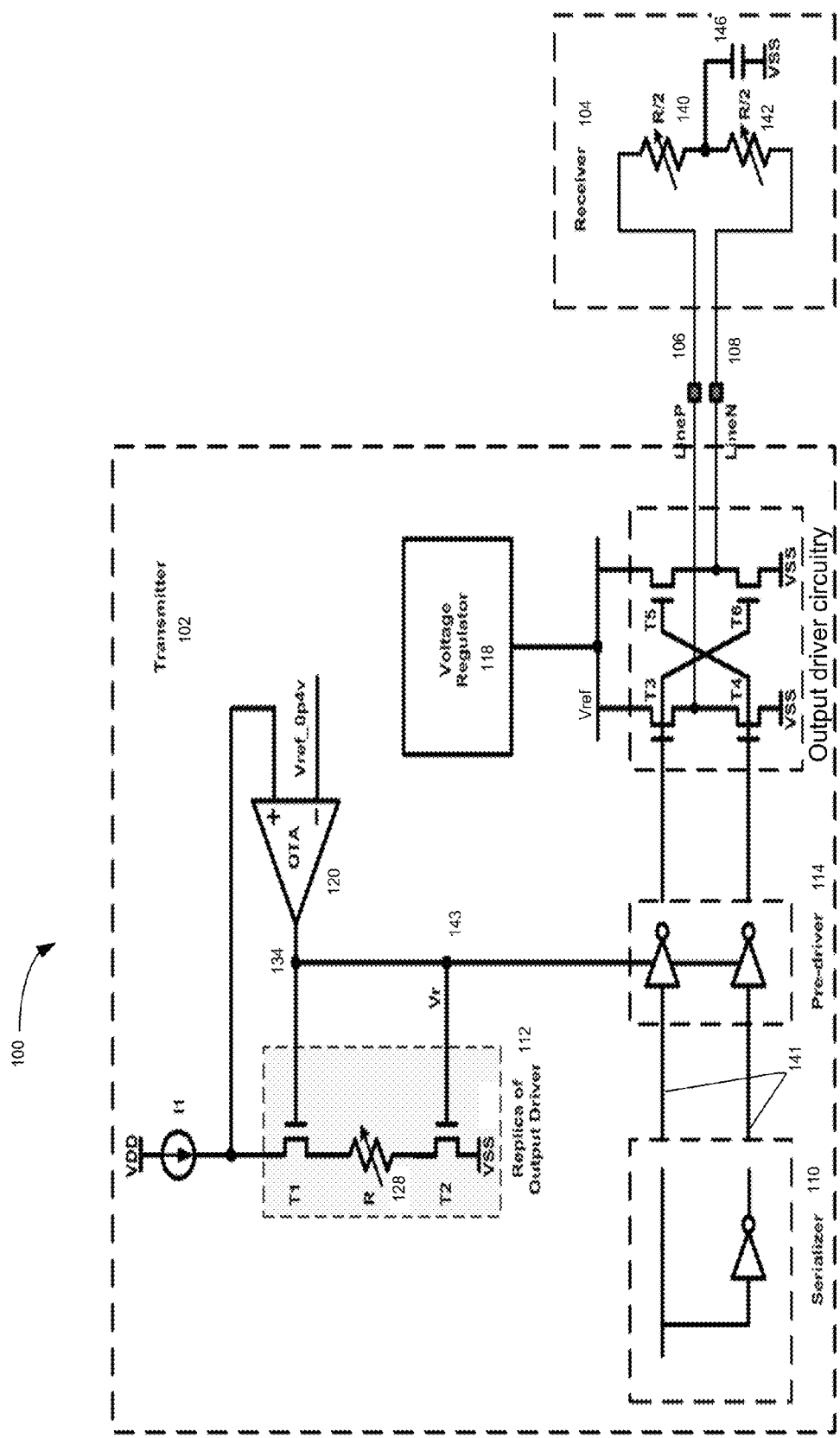
FIG. 1 is a schematic diagram illustrating a prior art voltage-mode driver and circuitry that includes a replica of an output driver circuitry for controlling an output impedance.

FIG. 1 illustrates an exemplary prior art differential voltage-mode driver 100 that includes a replica 112 of output driver circuitry 116 for controlling an output impedance. The differential voltage-mode driver 100 includes a transmitter section 102 and a receiver section 104. The transmitter section 102 of the voltage-mode driver and circuitry 100 includes a serializer/deserializer 110, replica circuitry 112, a pre-driver 114, output driver circuitry 116, a voltage regulator 118, an operational transmittance amplifier (OTA) 120, a first voltage source VDD, a second voltage source VSS and a current mirror I1. The receiver section 104 includes variable resistors 140 and 142, a capacitor 146 and the second voltage source VSS. The transmitter section 102 is coupled to the receiver section 104 via transmission lines 106 and 108. The transmission lines 106 and 108 transmit data. In one exemplary configuration, the transmission lines have a characteristic impedance of 50 ohms.

The serializer/deserializer (SerDes) 110 may be coupled to the pre-driver such that parallel data received at the SerDes 110, is converted to a serial output. The output of the SerDes 110 drives a differential signal into a transmission media 141 (e.g., 50 ohm transmission media). The differential signal drive has the advantage of common mode noise rejection because any noise seen by both signals is canceled out by the differential signaling.

The replica circuitry 112 or reflector is a replica of the output or output driver circuitry 116. The replica circuitry 112 includes driver transistor T1, driver transistor T2, a variable resistor 128 and the second voltage source VSS. The source of the driver transistor T1, for example, may be coupled to the current mirror I1, the gate coupled to the OTA 120 and the drain coupled to the variable resistor 128. The drain of the driver transistor T2 may be coupled to the variable resistor R, the gate may be coupled to an output node 134 of the OTA 120 and the source may be coupled to the second voltage source VSS.

The replica circuitry 112 produces a supply of voltage Vr (e.g., regulated voltage) for the pre-driver 114. In the implementation of FIG. 1, the regulated voltage Vr is the bias voltage for both the transistors T1 and T2. The regulated voltage Vr can be produced in a single feedback loop, based on the impedance matching between the transistors T1 and T2. In particular, the operational transmittance amplifier 120 generates regulated supply voltage or bias voltage Vr at nodes 134 and 143, which correspond to the gate voltages of transistors T1 and T2, respectively. The transistors T1 and T2 and the operational transmittance amplifier 120 form a single feedback loop where an output from the replica of the output driver circuitry 116 is fed back into an input of the operational transmittance amplifier 120. The single feedback loop controls two parameters including the transistor T1 and the transistor T2.

The operational transmittance amplifier 120 provides a constant voltage to the replica circuitry 112. The input Vref_0p4v is defined by the output voltage swing. The current mirror I1 provides a constant current to the replica circuitry 112 to achieve a desired resistance of the replica circuitry 112 based on the constant voltage. The replica circuitry 112 controls the pre-driver 114, which controls the output impedance of the output driver circuitry 116. The output swing of the pre-driver 114 is set by the regulated voltage Vr, which also controls the voltage-mode driver's output impedance. The pre-driver 114 toggles between, for example 0 volts and a real voltage such as the regulated voltage or bias voltage Vr. The output driver circuitry output swing is regulated by a reference voltage Vref from the voltage regulator 118. The output driver circuitry 116 selectively couples to the transmission lines 106 and 108.

The output driver circuitry 116 includes transistors T3, T4, T5 and T6. The transistors T3 and T5 of the output driver circuitry 116 correspond to the transistor T1 of the replica circuitry 112. The transistors T4 and T6 of the output driver circuitry 116 correspond to the transistor T2 of the replica circuitry 112. The output driver circuitry 116 is driven by the replica circuitry 112 such that the impedance of the corresponding transistors of the replica circuitry 112 and transistors of the output driver circuitry 116 during normal operation are equivalent. The transistors T1 and T2 of the replica circuitry 112 are the duplicates of the transistors T3, T4, T5 and T6 in the output driver circuitry 116.

The sum of on-resistance of the driver transistors T1 and T2 in the replica circuitry 112 is controlled by the OTA 120 based on a feed back loop. However, the on-resistances of each of the drive transistors T1 and T2 can vary so long as the sum of the on-resistances of each of the drive transistors T1 and T2 is constant. A regulated voltage Vr based on the OTA 120 may be the bias voltage for the drive transistors T1 and T2. The bias voltage may be varied such that the sum of the impedance of transistors T1 and T2 adds up to a predetermined value, e.g., 100 ohms, where the impedance of the drive transistors T1 and T2 are not equal. The impedances are unequal because both transistor T1 and transistor T2 are controlled by a single loop where the output of the replica circuitry 112 is fed back into an input of the OTA 120. Because drive transistors T1 and T2 are not independently controlled, their on-resistance may not be equal.

Although the configuration of FIG. 1 can set differential output resistance to proper termination impedance and achieve good differential termination, the single-ended output resistance of this configuration may not be balanced if the on-resistance of T1 does not equal the on-resistance of T2. This feature of the FIG. 1 configuration may cause common-mode voltage shift, different reflection on different output lines, and may even cause the single-ended output resistance to be out of specification.

Therefore, proper termination impedance of the output driver circuitry 116 in accordance with the impedance of the transmission lines is desirable. Matching the output impedance of the output driver circuitry 116 to the impedance of the transmission lines 106 and 108 can avoid reflection between the transmission lines 106 and 108, for example. In particular, it is desirable to implement a voltage-mode driver that is capable of providing a symmetric single-ended output resistance with proper termination impedance that benefits from both differential and single-ended termination.

Figure 2:
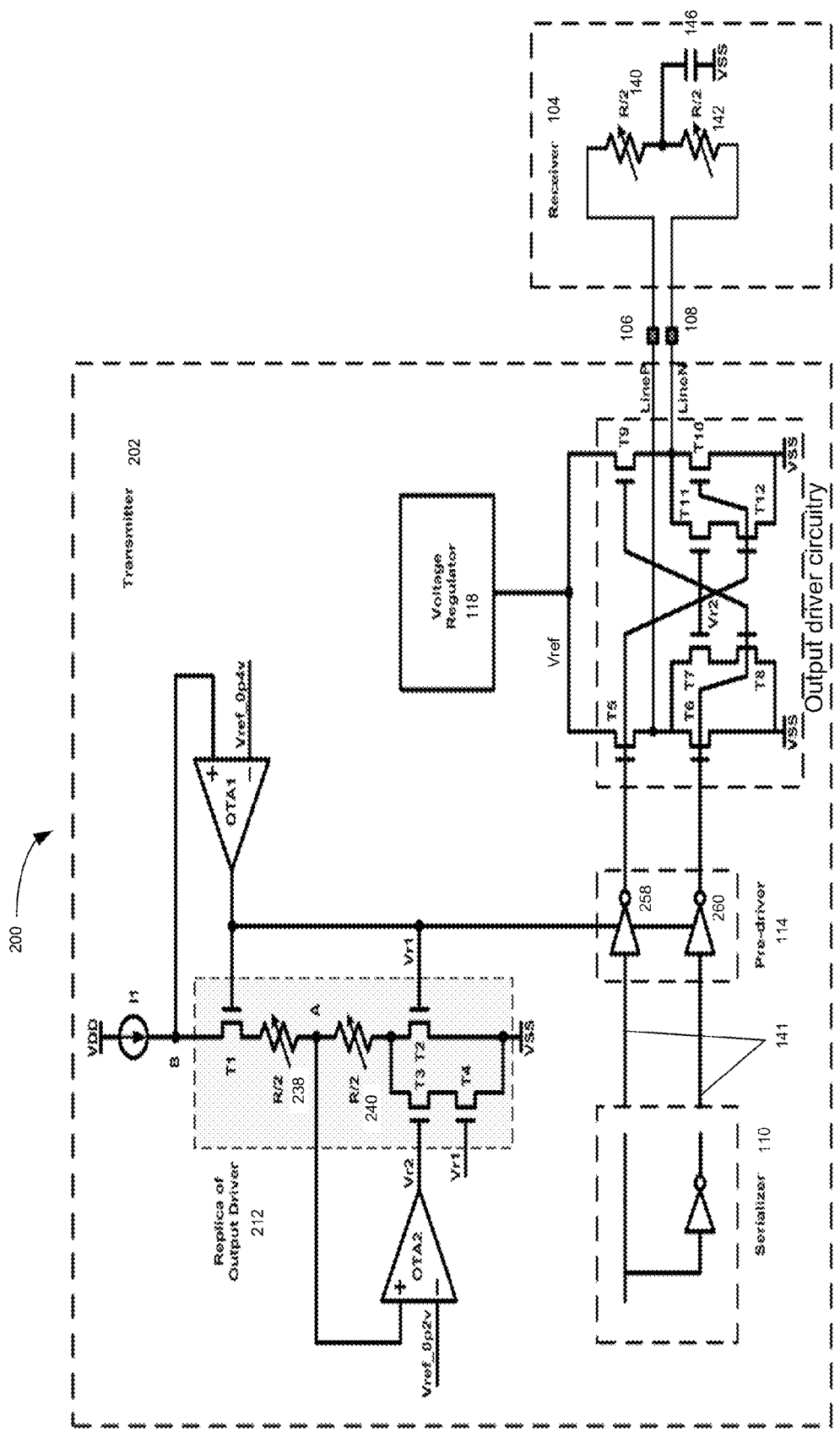
FIG. 2 is a schematic diagram illustrating an exemplary voltage-mode driver including symmetric single-ended output resistance according to some aspects of the disclosure.

FIG. 2 illustrates voltage-mode driver and circuitry 200 that includes an improved replica 212 of the output driver circuitry 216 that is used to control the output impedance. The voltage-mode driver and circuitry 200 include a transmitter section 202 and a receiver section 104. The transmitter section 202 is coupled to the receiver section 104 via transmission lines 106 and 108. The transmitter section 202 includes the SerDes 110, a replica 212 of the output driver circuitry 216, the pre-driver 114, improved driver circuitry 216, the voltage regulator 118, a first operational transimpedance amplifier OTA1, a second operational transimpedance amplifier OTA2, the first voltage source VDD, the second voltage source VSS and the current mirror I1. Similar to the illustration in FIG. 1, the receiver section 104 includes the variable resistors 140 and 142, the capacitor 146 and the second voltage source VSS. As previously noted, the transmission lines 106 and 108 may have a characteristic impedance of 50 ohms.

The output driver circuitry 216 includes transistors T5, T6, T7, T8, T9, T10, T11 and T12. The transistors T5 and T9 of the output driver circuitry 216 correspond to the transistor T1 of the replica circuitry 212. The transistors T10, T11 and T12 of the output driver circuitry 216 correspond to the transistors T2, T3 and T4 of the replica circuitry 212. The transistors T6, T7 and T8 of the output driver circuitry 216 also correspond to the transistor T2, T3 and T4 of the replica circuitry 212. A second reference voltage Vr2 is set to ensure the voltage on node A is substantially equal to Vref_0p2v and half the voltage of node B. Properly setting the value of Vr2 ensures the on-resistance between the upper and lower portions is substantially equal. The output driver circuitry 216 is driven by the replica circuitry 212 such that the impedance of the corresponding transistors of the replica circuitry 212 and transistors of the output driver circuitry 216 during normal operation are equivalent. Because matching output impedance is desirable, the output driver circuitry 216 should have output impedance equal to the characteristic impedance of the transmission line.

The replica circuitry 212 or reflector is a replica of the output driver circuitry 216. In some aspects of the disclosure, the second replica circuitry 212 includes two independently controlled portions. The first controlled portion is associated with the first OTA OTA1 and the second controlled portion is associated with the second OTA OTA2. In particular, the first controlled portion includes transistor T1 and resistor 238 and the second controlled portion includes transistors T2, T3 and T4 and resistor 240.

The first OTA OTA1 and the second OTA OTA2 provide a constant voltage to the replica circuitry 212. The current mirror I1 provides a constant current to the replica circuitry 212 to achieve a desired resistance of the replica circuitry 212 based on the constant voltage. In some aspects of the disclosure, the first OTA OTA1 provides constant voltage to the first controlled portion and the second OTA OTA2 provides constant voltage to the second controlled portion.

The replica circuitry 212 generates a supply of voltage Vr1 (e.g., regulated or bias voltage) for the pre-driver 114. The bias voltage Vr1 controls the pre-driver 114, which controls the output impedance of the output driver circuitry 216. The bias voltage Vr1 is based on impedance matching between the transistors of the replica circuitry 212. The impedance matching can be implemented by matching the impedance of the first controlled portion to the impedance of the second controlled portion. The impedance of the first controlled portion is based on a first feedback loop implementation. The impedance of the second controlled portion is based on a second feedback loop implementation.

The transistors T2, T3, T4, variable resistor 238 and the second OTA OTA2 form the second feedback loop where an output from the second controlled portion is fed back into an input of the second operational transmittance amplifier OTA2. The transistor T1, variable resistor 238 and the first OTA OTA1 form the first feedback loop where an output from the first controlled portion is fed back into an input of the first OTA OTA1. The first loop controls the impedance of the transistor T1 and the second loop controls the impedance of the transistors T2, T3, T4. In addition to the feed back input received at the input of OTA1, OTA1 receives a second input, Vref_op4v, defined by an output voltage swing. In addition, to the feedback input received at the input of OTA2, OTA2 receives a second input, Vref_op2v, which is a fraction, e.g., half, of the value of Vref_op4v. In an exemplary configuration, Vref_op2v is 0.2V and Vref_op4v is approximately 0.4V such that the on-resistance of the first controlled portion is substantially equal to the on-resistance of the second controlled portion.

As noted above, the second reference voltage Vr2 at the output of the second OTA OTA2 allows the voltage at node A to be halfway between the voltage of node B and ground. By varying the second reference voltage Vr2 of the second OTA OTA2, the on-resistance of T1 (of the first controlled portion) can be configured to be equal to the on-resistance of the combination of T2, T3, and T4 (of the second controlled portion). This implementation can achieve a symmetric single-ended output resistance with proper termination impedance for both differential and single-ended termination.

In particular, the replica circuitry 212 generates the regulated voltage Vr. The output swing of the pre-driver 114 is set by the regulated voltage Vr, which also controls the voltage-mode driver's output impedance. The pre-driver 114 toggles between, for example 0 volts and a real voltage, such as the regulated voltage or bias voltage Vr. The voltage mode driver's output swing is regulated by the reference voltage Vref from the voltage regulator 118. The output driver circuitry 116 selectively couples to the transmission lines 106, 108. When the inverter 258 of the pre-driver 114 is on or high, the transistor T5 of the voltage-mode driver is biased the same way as the transistor T1 of the replica circuitry 212. Under normal operation, the impedance of the transistor T5 is the same as the impedance of the transistor T1. For example, if impedance of transistor T1 is 50 ohms then the impedance of transistor T5 is also 50 ohms. This feature of the transistor T5 also applies to the transistor T9 based on a switching implementation at the pre-driver 114.

Similarly, when the inverter 260 of the of the pre-driver 114 is on or high, the transistors T10, T11 and T12 of the output driver circuitry 216 are biased the same way as the transistors T2, T3 and T4 of the replica circuitry 212. Under normal operation, the impedance across the transistors T10, T11 and T12 is the same as the impedance across the transistors T2, T3 and T4. For example, if the impedance across the transistors T2, T3 and T4 is 50 ohms then the impedance across the transistors T10, T11 and T12 is also 50 ohms. This feature of the transistors T10, T11 and T12 also applies to transistors T6, T7 and T8 depending on a switching implementation at the pre-driver 114. As a result, the impedance observed from the receiver's perspective for the transmission line 106 (e.g., 50 ohm) is equivalent to the impedance observed for the transmission line 108 (e.g., 50 ohm). This feature is in contrast to the illustration of FIG. 1 where the impedance observed from the receiver's perspective for the transmission line 106 may not be equivalent to the impedance observed for the transmission line 108.

Although the controlled portions are independently controlled by, among others, the first and second OTAs OTA1, OTA2, the controlled portions are part of the same replica circuitry 212. In some aspects, the controlled portions may be separate and independent circuits but coupled to each other. Independent control of the two separate portions is desirable to ensure the resistance or effective on-resistance of the first controlled portion is equal to that of the second controlled portion. By ensuring that the first controlled portion (including T1) and second controlled portion (including T2, T3 and T4) have substantially equal or equal effective on-resistance, both differential output and single ended output can have proper termination impedance.

By having two independently controlled portions, the implementation of FIG. 2 achieves symmetric single-ended output resistance with proper termination impedance and benefits both differential and single-ended termination. Further, the impact of the implementation on the area or power consumption of the overall voltage driver circuit is minimal or low.

Figure 3:
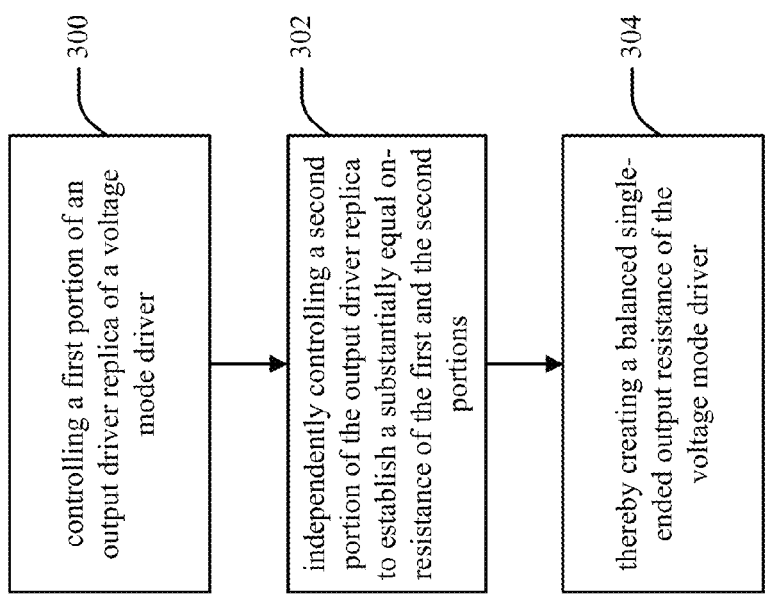
FIG. 3 illustrates a method for implementing symmetric single ended termination in a differential voltage mode driver according to an aspect of the present disclosure.

FIG. 3 illustrates a method for implementing symmetric single ended termination in a differential voltage mode driver according to an aspect of the present disclosure. At block 300, the method starts with controlling a first portion of an output driver replica of a voltage mode driver. At block 302, the method includes independently controlling a second portion of the output driver replica. Independent control establishes a substantially equal on-resistance of the first and the second portions. Thus, a balanced single-ended output resistance of the voltage mode driver results.

In one configuration, the apparatus includes means for driving an output of a voltage mode driver having a predefined termination impedance. In one aspect of the disclosure, the output driving means may be the output driver 216 configured to perform the functions recited by the output driving means. In one configuration, the apparatus includes means for replicating the output driver means by independently controlling a first and a second portion of the replica means. In one aspect of the disclosure, the replica means may be the replica of the output driver 212, operational transimpedance amplifiers OTA1 and/or OTA2 configured to perform the functions recited by the replica means.

Figure 4:
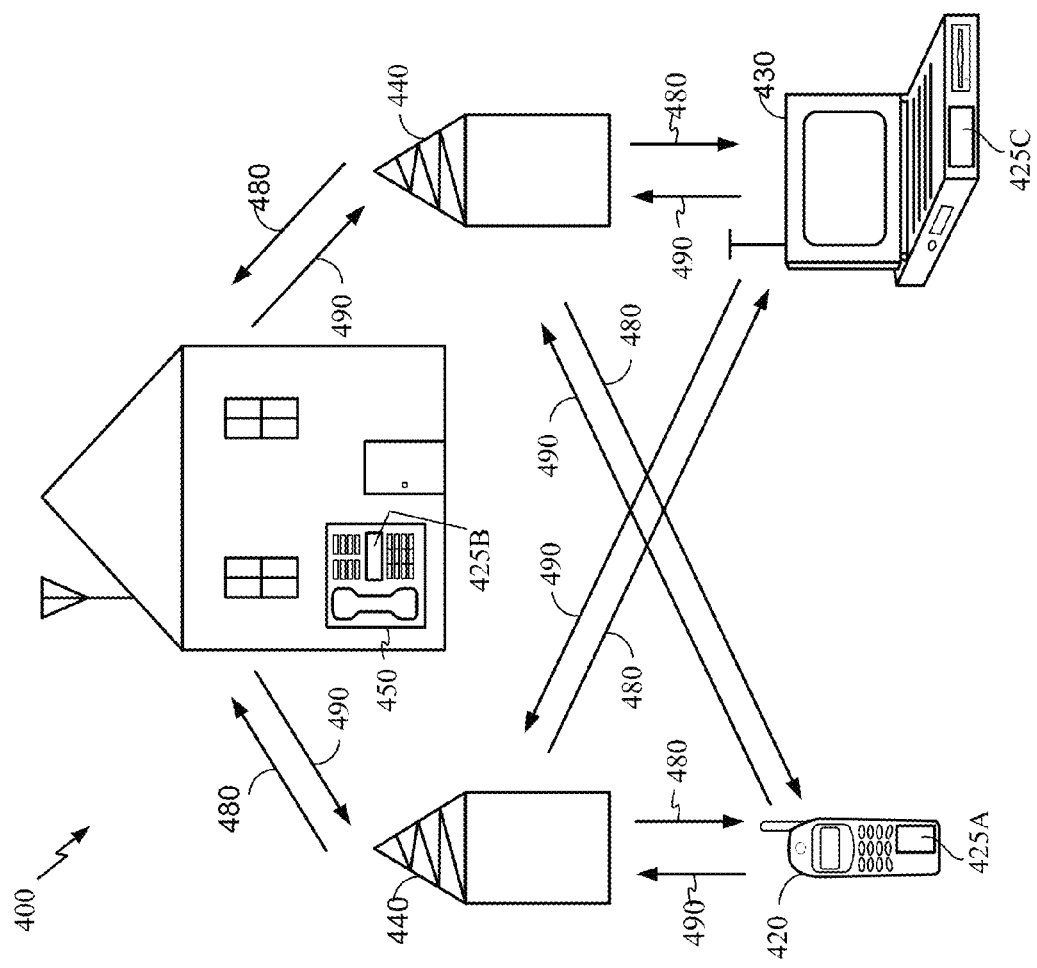
FIG. 4 shows an exemplary wireless communication system in which an embodiment of the disclosure may be advantageously employed.

FIG. 4 shows an exemplary wireless communication system 400 in which an embodiment of the improved differential voltage mode driver may be advantageously employed. For purposes of illustration, FIG. 4 shows three remote units 420, 430, and 450 and two base stations 440. It will be recognized that wireless communication systems may have many more remote units and base stations. Remote units 420, 430, and 450 include the improved differential voltage mode driver. FIG. 4 shows forward link signals 480 from the base stations 440 and the remote units 420, 430, and 450 and reverse link signals 490 from the remote units 420, 430, and 450 to base stations 440.

In FIG. 4, the remote unit 420 is shown as a mobile telephone, remote unit 430 is shown as a portable computer, and remote unit 450 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 4 illustrates remote units, which may employ an improved differential voltage-mode driver according to the teachings of the disclosure, the disclosure is not limited to these exemplary illustrated units. For instance, an improved differential voltage-mode driver according to embodiments of the present disclosure may be suitably employed in any device.

Although specific circuitry has been set forth, it will be appreciated by those skilled in the art that not all of the disclosed circuitry is required to practice the disclosed embodiments. Moreover, certain well known circuits have not been described, to maintain focus on the disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. An apparatus comprising:
   output driver circuitry having a predefined termination impedance; and an output driver replica of the output driver circuitry having independently controlled first and second portions, the first and second portions being independently controlled by a first feedback loop and a second feedback loop, respectively, to establish a substantially equal on-resistance of the first and the second portions, in which an output of the first portion is directly fed back into an input of the first portion, and an output of the second portion is directly fed back into an input of the second portion, the output driver replica controlling the predefined termination impedance of the output driver circuitry.

2. The apparatus of claim 1, further comprising a first controller configured to independently control the first portion with the first feedback loop and a second controller configured to independently control the second portion with the second feedback loop.

3. The apparatus of claim 2, in which the first and the second controllers are configured to establish substantially equal on-resistance at the first and the second portions by setting the voltage at a node between the first and second portions to half of a predefined reference voltage.

4. The apparatus of claim 2, in which the first and the second controllers comprise operational transmittance amplifiers.

5. The apparatus of claim 1, in which the first and the second portions of the output driver replica are implemented within a single circuit.

6. The apparatus of claim 1, in which the first and the second portions of the output driver replica are implemented such that transistors of the first and the second portions are positioned within the same circuit to correspond with the positions of transistors in the output driver circuitry.

7. The apparatus of claim 1, in which a plurality of transistors are implemented in parallel at the output driver circuitry to match a corresponding impedance of at least one transistor at the output driver replica.

8. The apparatus of claim 1, further comprising a pre-driver controlled by the output driver replica, the pre-driver being configured to control an output impedance of the output driver circuitry.

9. The apparatus of claim 1, integrated into a mobile phone, a set top box, a music player, a video player, an entertainment unit, a navigation device, a computer, a hand-held personal communication systems (PCS) unit, a portable data unit, and/or a fixed location data unit.

10. A method comprising:
controlling a first portion of an output driver replica of a voltage mode driver by a first feedback loop; and
independently controlling a second portion of the output driver replica to establish a substantially equal on-resistance of the first and the second portions, thereby creating a balanced single-ended output resistance of the voltage mode driver, the second portion controlled by a second feedback loop in which an output of the first portion is directly fed back into an input of the first portion, and an output of the second portion is directly fed back into an input of the second portion.

11. The method of claim 10, in which independently controlling the second portion comprises setting a voltage at a node between the first and the second portions to half of a predefined reference voltage.

12. The method of claim 10, further comprising,
controlling a pre-driver with the output driver replica to control an output impedance of the output driver circuitry.

13. The method of claim 10, further comprising applying an output of the voltage mode driver in a mobile phone, a set top box, a music player, a video player, an entertainment unit, a navigation device, a computer, a hand-held personal communication systems (PCS) unit, a portable data unit, and/or a fixed location data unit.

14. A method comprising the steps of:
controlling a first portion of an output driver replica of a voltage mode driver by a first feedback loop; and
independently controlling a second portion of the output driver replica to establish a substantially equal on-resistance of the first and the second portions, thereby creating a balanced single-ended output resistance of the voltage mode driver, the second portion controlled by a second feedback loop in which an output of the first portion is directly fed back into an input of the first portion, and an output of the second portion is directly fed back into an input of the second portion.

15. The method of claim 14, further comprising the step of applying an output of the voltage mode driver in a mobile phone, a set top box, a music player, a video player, an entertainment unit, a navigation device, a computer, a hand-held personal communication systems (PCS) unit, a portable data unit, and/or a fixed location data unit.

16. An apparatus comprising:
means for driving an output of a voltage mode driver having a predefined termination impedance; and
means for replicating the output driving means by independently controlling first and second portions of the replicating means, to establish a substantially equal on-resistance of the first and the second portions, the replicating means controlling the predefined termination impedance of the output driving means, the first and second portions controlled by a first feedback loop and a second feedback loop, respectively in which an output of the first portion is directly fed back into an input of the first portion, and an output of the second portion is directly fed back into an input of the second portion.

17. The apparatus of claim 16, further comprising means for establishing substantially equal on-resistance at the first and the second portions by setting the voltage at a node between the first and second portions to half of a predefined reference voltage.

18. The apparatus of claim 16, further comprising means for controlling an output impedance of the output driving means, the controlling means being controlled by the replicating means.

19. The apparatus of claim 16, integrated into a mobile one, a set top box, a music player, a video player, an entertainment unit, a navigation device, a computer, a hand-held personal communication systems (PCS) unit, a portable data unit, and/or a fixed location data unit.

* * * * *